UNITED STATES PATENT OFFICE.

EMIL PODSZUS, OF TREPTOW, NEAR BERLIN, GERMANY, ASSIGNOR, BY MESNE ASSIGNMENTS, TO THE CHEMICAL FOUNDATION, INC., A CORPORATION OF DELAWARE.

PROCESS OF MAKING SOLID BODIES FROM NITRIDS.

1,337,264.   Specification of Letters Patent.   Patented Apr. 20, 1920.

No Drawing. Application filed October 21, 1914, Serial No. 867,868. Renewed June 26, 1919. Serial No. 306,880½.

*To all whom it may concern:*

Be it known that I, EMIL PODSZUS, a citizen of the German Empire, residing at Treptow, near Berlin, Germany, have invented certain new and useful Improvements in the Processes of Making Solid Bodies from Nitrids; and I do hereby declare the following to be a full, clear, and exact description of the invention, such as will enable others skilled in the art to which it appertains to make and use the same.

My invention relates to improvements in the process of making solid bodies from nitrids and the bodies obtained thereby. Heretofore it has not been possible to frit or sinter together nitrids such as boron or titanium nitrids and other refractory substances which have no melting point under ordinary pressure and are sublimated when heated. Therefore it has not been possible to shape such substances into solid bodies of any desired form, which would be desirable in view of various well known properties of the substances, particularly of the boron nitrid. The object of the improvements is to provide a process whereby substances of the class indicated can be fritted together into solid bodies of any desired form. With this object in view my invention consists in first shaping bodies of the desired form from such compounds as may form the basis elements of the substances, for example from compounds of boron, titanium, zirconium, etc., which can be fritted together by known methods, fritting the said compounds together, and thereafter transforming the same into the nitrids by a suitable process, for example by a thermochemical process, and preferably by glowing the same in a current of ammonia. Compounds which are suitable in my process are for example the oxids and the sulfids of the said elements, and I have found that the most suitable compounds are the oxids, which are easily fritted together and can be baked or fritted if necessary in an oxidizing atmosphere. When glowing in ammonia is continued slowly and long enough, the bodies are transformed into uniform and solid nitrid bodies. In some cases, for example when glowing titanium nitrid, the bodies show cracks, which however is avoided by subjecting the material such as the oxid to a preliminary baking or melting process at a sufficiently high temperature. By my improved process nitrid bodies are obtained which are almost impermeable to gases. However where large bodies must be transformed the process requires much time, because the action of the ammonia is slow by reason of the slow diffusion. Therefore my improved process is particularly useful, where the bodies to be produced are comparatively thin and consist for example of thin tubes, threads, and the like, in which cases bodies are produced which are durable and uniform.

In a preferred modification of the process I do not use as starting substances exclusively the oxid or other suitable compound of the basis material, but I add thereto the nitrid which is uniformly mixed with the compound, the amount of the latter being sufficient to bind the whole mass into a coherent mass by melting or fritting. This process is particularly advisable when producing boron-nitrid, because from pure boron trioxid which melts at a comparatively low temperature, a body of boron nitrid can not easily be obtained. A mass of oxid which is uniformly distributed is obtained by partial oxidation of the pure nitrid, for example by forming from the nitrid and a suitable organic binding medium as is commonly used as binders in sintering processes bodies of the desired form, and burning therefrom the binding medium.

By the same process bodies of mixtures of nitrids and other substances, such as tungsten and other metals, can be produced, by admixing the said substances with the starting material, for example with the oxid.

In order that the invention be more clearly understood, I shall now describe by way of example the manufacture of a body of boron nitrid.

From finely ground boron nitrid and a sufficient amount of a suitable organic binding medium a plastic mass is made and treated in a wet state, until a sufficient amount of boric acid has been formed. If desired the boric acid may be added to the boron nitrid together with the binding medium, in which case however the amount should not be too large. The plastic mass is now brought into the desired form and dried, whereupon it is liberated from the organic binding medium preferably in an oxidizing atmosphere, whereby the boric acid is fritted and cements the particles of boron nitrid together. Thereupon the formed body is slowly glowed in a current of ammonia, so that gradually a body of boron nitrid is produced. In order to render the said body more dense I prefer to imbibe the same with glyceryl borate or molten boron trioxid and to glow the same once more. Thereby a body of high density is obtained.

Bodies which have thus been produced are suitable for numerous purposes, particularly where high temperatures are required, and in a reducing atmosphere, because the boron nitrid which is thus produced is dissociated at a temperature of not less than 2000 degrees centigrade and is sublimated in a current of hydrogen only at a temperature which is even higher, while in a current of ammonia and nitrogen it is refractory even at higher temperatures, for example in an atmosphere of nitrogen at a temperature of 3000 degrees centigrade. Therefore when used as a material for constructing furnaces it is superior to all the materials which have heretofore been used for this purpose, so much the more as the material is also electrically insulating at the highest temperatures and is not affected by changes in the temperature. Furthermore it is important as a substance for making crucibles for melting metal, because even boiling alkali metals have no injurious effect on the same.

Objects of titanium nitrid are made in a similar way, by finely grinding a burnt or molten oxid, adding a suitable organic binding medium sufficient to form a paste or plastic mass and bringing the same in the desired form, and burning the same in an oxidizing flame and thereafter in ammonia, or directly in ammonia. In this process the oxid is at first fritted together and is thereafter transformed into the nitrid. If it is desired to mix the same with a metal such as tungsten, the metal is admixed with the oxid, and the whole mass is burnt in ammonia. A modification of the process consists in making a solid body from the basis element of the nitrid, and transforming the same into the nitrid.

I claim herein as my invention:

1. The hereindescribed process of making solid nitrid bodies, which comprises shaping or forming a body of a frittable compound capable of being transformed into nitrid, having high heat resisting properties, while maintaining its form, fritting or sintering the body, and thereafter converting the fritted or sintered and shaped body into nitrid.

2. The hereindescribed process of making solid nitrid bodies, which comprises shaping or forming a body of a frittable compound capable of being transformed into nitrid, having high heat resisting properties, while maintaining its form, fritting or sintering the body and thereafter converting the fritted or sintered and shaped body into nitrid by heating the same in an atmosphere of ammonia.

3. The hereindescribed process of making solid nitrid bodies having high heat resisting properties, which comprises shaping or forming a body of a mixture of nitrid and a frittable compound capable of being transformed into nitrid while maintaining its form, fritting or sintering the compound and thereafter converting the fritted or sintered compound into nitrid.

4. The hereindescribed process of making solid nitrid bodies, which comprises shaping or forming a body of a frittable compound capable of being transformed into nitrid, having high heat resisting properties, while maintaining its form, fritting or sintering the body, and thereafter converting the fritted or sintered and shaped body into nitrid, imbibing the body with a compound capable of being transformed into nitrid, and transforming the imbibed compound into nitrid.

5. The hereindescribed process of making solid nitrid bodies having high heat resisting properties, which comprises shaping or forming a body of a frittable compound capable of being transformed into nitrid mixed with a metal also capable of being transformed into a nitrid, fritting or sintering the body and then converting the mixture while retaining its shape into nitrid.

6. The hereindescribed process of making solid nitrid bodies having high heat resisting properties, which comprises fritting a compound capable of being transformed into nitrid, forming or shaping the ground fritted compound, fritting or sintering the mass while retaining its shape and transforming the fritted shaped body into nitrid.

7. The hereindescribed process of making solid nitrid bodies having high heat resisting properties, which comprises subjecting a compound capable of being transformed into nitrid to melting, shaping and forming the ground resulting product, fritting the formed body and then transforming it into nitrid in a nitrogen containing gas.

8. The hereindescribed process of making solid nitrid bodies, which comprises shaping or forming a body of a frittable compound capable of being transformed into nitrid rendered plastic with a carbonizable and oxidizable binder, fritting the body so formed and simultaneously eliminating the binder, and then heating the body in an atmosphere of ammonia at a temperature sufficient to convert the compound into nitrid.

In testimony whereof I hereunto affix my signature in the presence of two witnesses.

EMIL PODSZUS.

Witnesses:
HENRY HASPER,
WOLDEMAR HAUPT.